United States Patent [19]
Tuttlebee

[11] Patent Number: 6,102,173
[45] Date of Patent: Aug. 15, 2000

[54] ROTARY COUPLING APPARATUS FOR TRANSMISSION CABLES

[75] Inventor: Roger Tuttlebee, Peterborough, United Kingdom

[73] Assignee: Hubbell Incorporated, Orange, Conn.

[21] Appl. No.: 09/024,448

[22] Filed: Feb. 17, 1998

[51] Int. Cl.$^7$ .................................................. H02G 11/00
[52] U.S. Cl. .................................. 191/12 R; 191/12.2 R; 191/12.4
[58] Field of Search ............................ 191/12 R, 12.2 R, 191/12.4

[56] References Cited

U.S. PATENT DOCUMENTS

| | | | |
|---|---|---|---|
| 4,946,010 | 8/1990 | DiBono | 191/12.2 R |
| 5,241,593 | 8/1993 | Wagner | 191/12.4 |
| 5,413,492 | 5/1995 | Obata | 439/164 |
| 5,450,509 | 9/1995 | Davis | 385/26 |
| 5,535,960 | 7/1996 | Skowronski et al. | 191/12.2 R |
| 5,718,310 | 2/1998 | Gallo | 191/12.2 R |

OTHER PUBLICATIONS

Fibre Optic Rotary Connector, 4 pages, by Stemmann–Technik GmbH of Schuttorf, Germany.
Nova Scotia Slip Rings, 6 pages, by Focal Technologies, Inc. of Dartmouth, Nova Scotia, Canada.

*Primary Examiner*—S. Joseph Morano
*Assistant Examiner*—Robert J. McCarry, Jr.
*Attorney, Agent, or Firm*—Jerry M. Presson; Michael R. Swartz

[57] ABSTRACT

A rotary coupling apparatus includes a stationary housing defining a chamber, an elongated hollow shaft extending through the chamber of the housing and rotatable relative thereto, a drum supported about the shaft and rotatable therewith, and an elongated coupling cable for carrying communications elements being disposed in the chamber and interconnecting the stationary housing with the rotatable drum. The stationary housing has a pair of spaced end walls and a circumferential side wall disposed therebetween. The end walls define the chamber therebetween and the circumferential side wall defines an outer periphery of the chamber. The shaft extends through the chamber between the end walls and is mounted to undergo rotation relative to the end walls. The circumferential side wall is radially spaced outwardly from and extends about the rotatable shaft and drum. The coupling cable terminates in a pair of opposite end portions, a first being secured to the stationary housing and a second being secured to the rotatable drum and shaft such that the second end portion of the coupling cable rotates with the drum and shaft as the first end portion of the coupling cable remains stationary with the stationary housing. The coupling cable is adapted to wind about the rotatable drum away from the circumferential side wall of the housing until reaching a wound condition about the drum and to unwind from the drum toward the circumferential side wall of the housing until reaching an unwound condition as the drum and shaft undergo rotation in clockwise and counterclockwise directions relative to the housing.

20 Claims, 3 Drawing Sheets

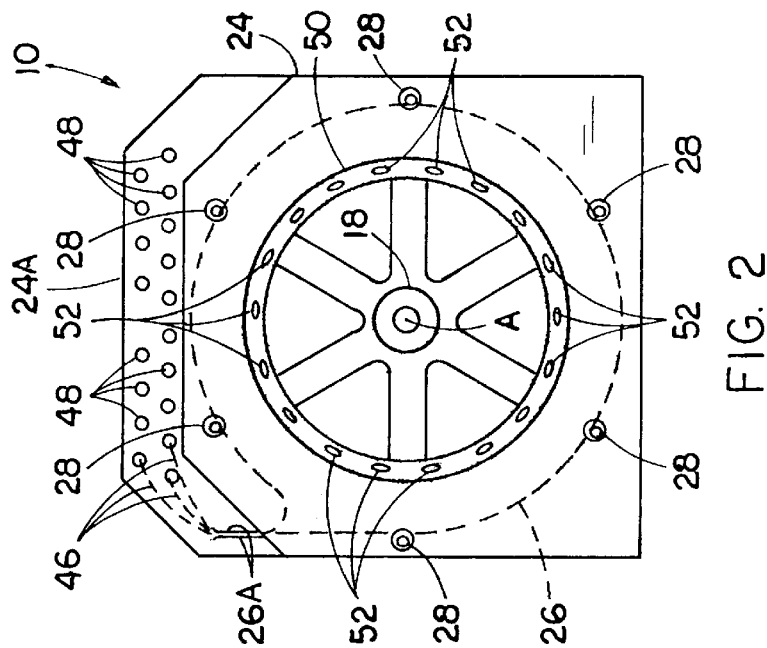
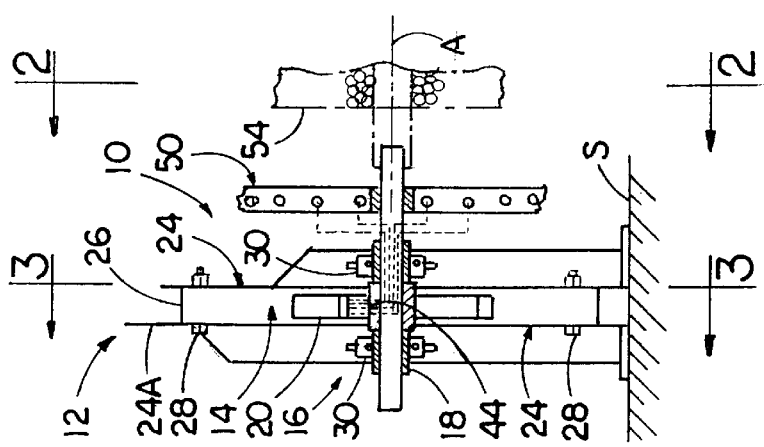
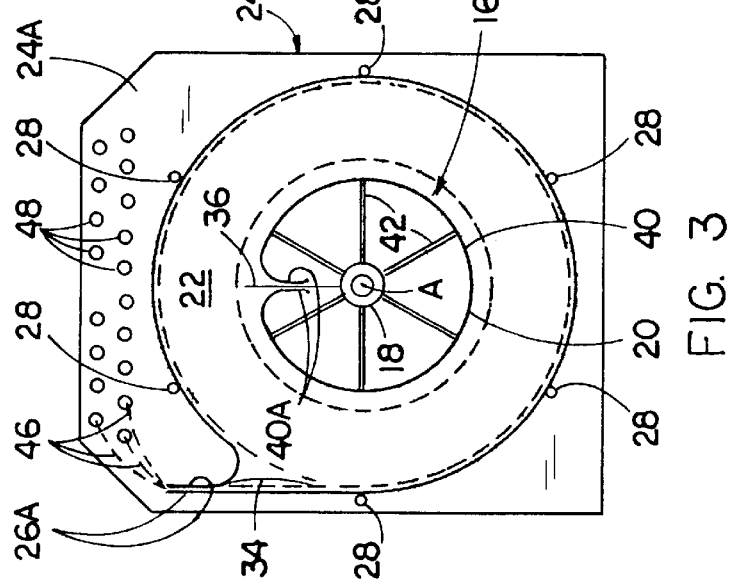

ROTARY COUPLING APPARATUS FOR TRANSMISSION CABLES

CROSS-REFERENCE TO RELATED APPLICATION

Certain subject matter disclosed in this application relates to the invention claimed in a copending patent application entitled "Composite Ribbon Coupling Cable For Rotary Coupling Assembly", designated Ser. No. 09/024,449, filed Feb. 17, 1998, which is assigned to the same assignee as this application.

BACKGROUND OF THE INVENTION

1. Field of the Invention

The present invention generally relates to transmission cables and, more particularly, is concerned with an apparatus for providing a rotary coupling between stationary and rotatable parts of transmission cables which permits their relative rotation without disrupting signal transmissions, whether electrical or optical, through the cables and between the stationary and rotatable parts thereof.

2. Description of the Prior Art

In many industries in general there is increasing use of computer technology to control the operation of machines and the movement of products. In many instances, such use of computer technology requires high quality transmission networks. Within the container shipping industry in particular there is increasing tendency towards tracing cargo by using computer technology. The achievement of computerized cargo traceability requires the use of high quality fiber optics in data transmission networks.

The data transmission cables, together with the power supply cables, of such networks have to be managed in some way when connected to moving machinery. Since the power supply cables are typically handled by the use of rotatable cable reels, it would then seem to readily follow that the transmission cables could be easily handled by placing them on the rotatable reels with the power cables. However, unlike the electricity being transmitted on power supply cables which can be "collected" by using slipring and brushgear assemblies, the bands of light in fiber optics have to be transmitted as a continuous unbroken beam. Effective transmission of continuous unbroken beams of light between stationary and rotating parts of transmission cables is thus more complicated than merely placing the transmission cables on the rotatable reels with the power cables.

Heretofore, the continuous transmission of light beams through fiber optics having relative rotating parts has been achieved using one of two methods. The first method involves the use of an optical rotary joint but this method is limited to a low number of passes through the cable. With respect to a single pass the optical joint is relatively straightforward, economical and reliable; but for two or more passes the joints become highly sophisticated in their optical engineering and are very expensive. However, the joints do have the advantage of being capable of rotating in either direction indefinitely. Several models of a device employing this first method are manufactured by Focal Technologies Inc. of Dartmouth, Nova Scotia, Canada.

The second method involves the use of some kind of transfer mechanism whereby a continuous length of fiber optic cable is wound and unwound from adjacent spools as a central shaft rotates. The winding and unwinding of the cable is such that it eliminates twisting of the cable. This type of device is limited to the relatively small number of rotations that can take place in one direction before it has to be reversed. Several models of a device employing this second method are manufactured by Stemmann-Technik GMBH of Schuttorf, Germany, and by Specimas Spa of Nova Milanese, Italy.

Consequently, a need exists for improvements which overcome the limitations of the aforementioned prior art devices without introducing any new limitations in their place.

SUMMARY OF THE INVENTION

The present invention provides a rotary coupling apparatus designed to satisfy the aforementioned needs. The rotary coupling apparatus of the present invention couples stationary parts of transmission cables with rotatable parts thereof so as to permit rotation of the rotatable parts relative to the stationary parts of the cables without disrupting signal transmissions, whether they be electrical or optical, through the cables and between the stationary and rotatable parts thereof.

Accordingly, the present invention is directed to a rotary coupling apparatus which comprises: (a) a stationary housing defining a chamber; (b) an elongated rotatable member including an elongated hollow shaft extending through the chamber of the housing and rotatable relative thereto and a drum supported about the shaft and rotatable therewith; and (c) an elongated coupling cable for carrying communications elements being disposed in the chamber and interconnecting the stationary housing with the rotatable drum. The stationary housing has a pair of spaced end walls and a circumferential side wall disposed therebetween. The end walls of the housing define the chamber therebetween and the circumferential side wall defines an outer periphery of the chamber. The shaft extends through the chamber between the end walls and is mounted to undergo rotation relative to the end walls. The circumferential side wall of the housing is radially spaced outwardly from and extends about the rotatable shaft and drum.

The coupling cable is disposed in the chamber of the housing between the circumferential side wall thereof and the drum of the rotatable member. The coupling cable terminates in a pair of opposite end portions, a first being secured to the stationary housing and a second being secured to the rotatable drum and shaft such that the second end portion of the coupling cable rotates with the drum and shaft as the first end portion of the coupling cable remains stationary with the stationary housing. The coupling cable is adapted to wind about the rotatable drum away from the circumferential side wall of the housing until reaching a wound condition about the drum and to unwind from the drum toward the circumferential side wall of the housing until reaching an unwound condition as the drum and shaft undergo rotation in clockwise and counterclockwise directions relative to the housing. The coupling cable preferably has a resiliently flexible flat construction which biases the coupling cable toward the unwound condition such that the coupling cable is adapted to unwind from and wind about the drum as the rotatable shaft and drum undergo either one of clockwise and counterclockwise rotations relative to the housing whereby the shaft and drum can continue rotation in a given one of the clockwise and counterclockwise directions as the coupling cable unwinds from and then winds about the drum before having to reverse direction when coupling cable reaches the wound condition about the drum.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an axial sectional view of a rotary coupling apparatus of the present invention.

FIG. 2 is a front elevational view of the apparatus as seen along line 2—2 of FIG.1.

FIG. 3 is an elevational view of the apparatus taken along line 3—3 of FIG. 1 with an unwindable and windable flat coupling cable employed in the apparatus being omitted.

DETAILED DESCRIPTION OF THE INVENTION

Figure 5:
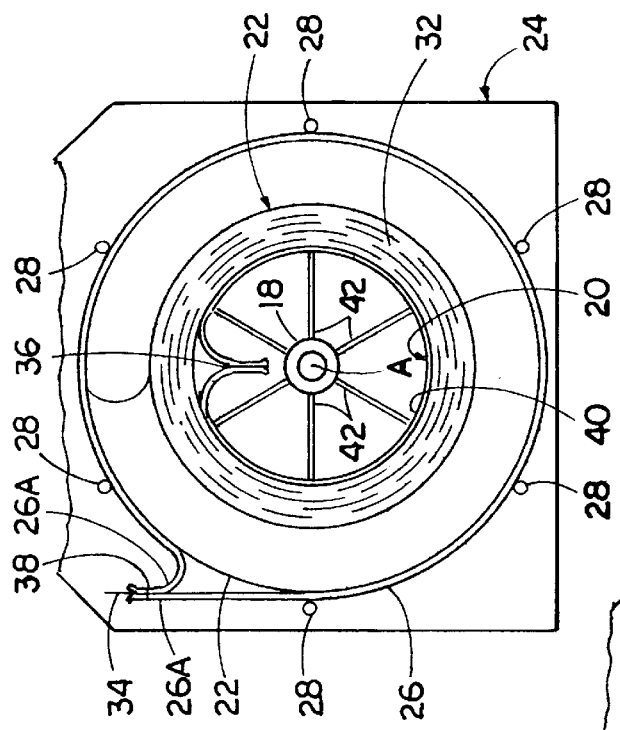
FIG. 5 is an elevational view similar to that of FIG. 4 but showing the coupling cable substantially fully wound in a clockwise direction on the rotary drum of the apparatus.

In the following description, like reference characters designate like or corresponding parts throughout the several views. Also in the following description, it is to be understood that such terms as "forward," "rearward," "left," "right," "upwardly," "downwardly," and the like, are words of convenience and are not to be construed as limiting terms.
Rotary Coupling Apparatus Referring now to the drawings, and particularly to FIGS. 1 to 8, there is illustrated the rotary coupling apparatus, generally designated 10, of the present invention. The rotary coupling apparatus 10 can be used with various types of transmission cables. By way of example, the type of transmission cables illustrated in the drawings can be conventional fiber optic cables or conventional electrical cables.

The rotary coupling apparatus 10 basically includes a stationary housing 12 defining a chamber 14, an elongated rotatable member 16 in the form of an elongated hollow shaft 18 extending through the chamber 14 of the housing 12 and rotatable relative thereto and a drum 20 disposed within the housing chamber 14 and supported about and rotatable with the shaft 18 about a longitudinal rotational axis A of the shaft 18, and an elongated coupling cable 22 for carrying communications elements being disposed in the chamber 14 and interconnecting the stationary housing 12 with the rotatable drum 20. More particularly, the stationary housing 12 of the apparatus 10 has a pair of spaced apart end walls 24 in the form of substantially flat plates stationarily supported in an upright position on a support structure S and a circumferential side wall 26 having a substantially cylindrical configuration disposed between the spaced end walls 24. The spaced end walls 24 define the chamber 14 therebetween while the circumferential side wall 26 defines an outer periphery of the chamber 14. The housing 12 also includes a plurality of fasteners 28, such as bolts and nuts, extending between and interconnecting the spaced end walls 24 and disposed exteriorly of and spaced about the circumferential side wall 26 of the housing 12 so as to retain the circumferential side wall 26 in the substantially cylindrical configuration and a stationary position between the spaced end walls 24 as seen in FIGS. 1–3.

The shaft 18 of the rotatable member 16 extends through the chamber 14 between the end walls 24 and is mounted by a pair of bearings 30 to undergo rotation relative to the end walls 24. The bearings 30 are respectively disposed and supported outside of and by the end walls 24 of the housing 12 where the bearings 30 rotatably support the elongated shaft 18 extending through the end walls 24. The circumferential side wall 26 is radially spaced outwardly from and extends about the rotatable shaft 18 and drum 20.

Figure 8:
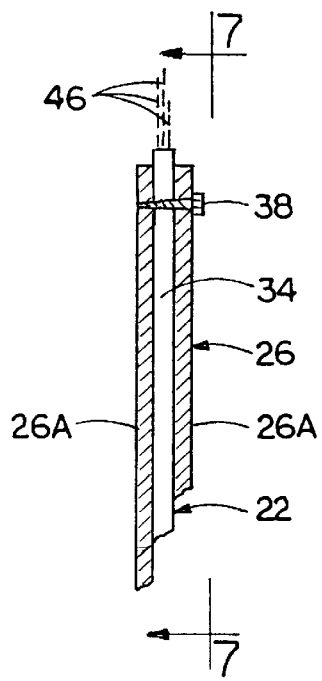
FIG. 8 is a cross-sectional view of the clamp securing the coupling cable taken along line 8—8 of FIG. 7.
Figure 7:
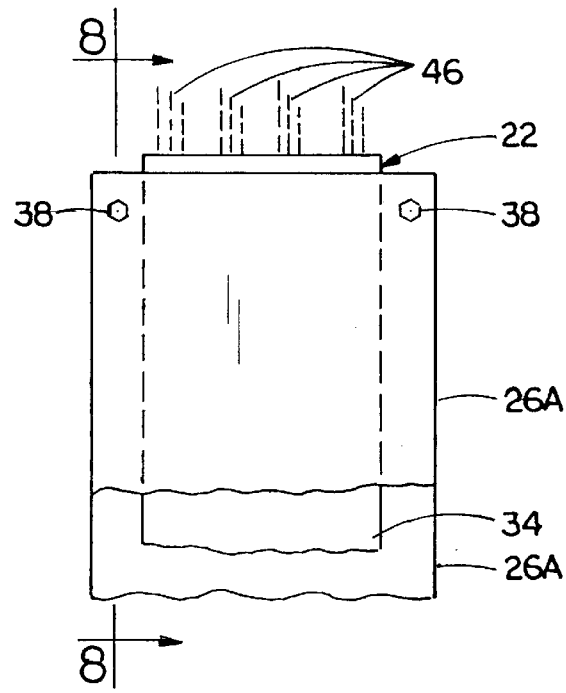
FIG. 7 is an enlarged fragmentary view of a clamp securing an end of the coupling cable as seen along line 7—7 of FIG. 8.
Figure 9:
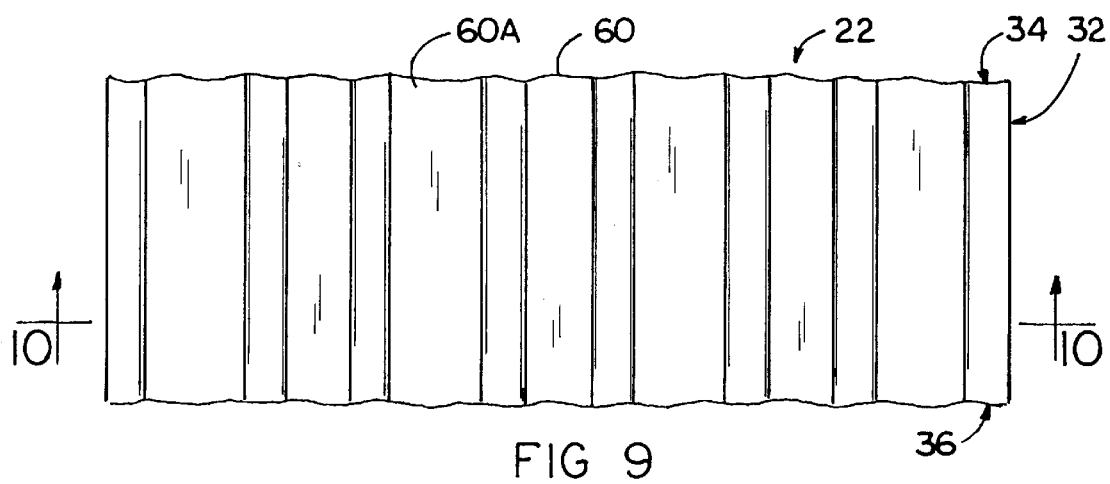
FIG. 9 is an enlarged fragmentary plan view of the coupling cable in the form of a composite ribbon coupling cable comprising the invention of the patent application cross-referenced above.

The coupling cable 22 of the apparatus 10 has a main portion 32 that is generally flat in its cross-sectional configuration as seen in FIGS. 7–10 and terminates in a pair of opposite first and second end portions 34, 36. The first end portion 34 of the coupling cable 22 is secured to the stationary housing 12 while the second end portion 36 of the coupling cable 22 is secured to the rotatable drum 20 such that the second end portion 36 of the coupling cable 22 rotates with the drum 20 and shaft 18 as the first end portion 34 of the coupling cable 22 remains stationary with the stationary housing 12. More particularly, as seen in FIGS. 1, 8 and 9, the side wall 26 of the stationary housing 12 which can be made of a thin sheet of metal has a pair of end portions 26A that are disposed in a facing relationship to one another with the first end portion 34 of the coupling cable 22 secured or clamped between the end portions 26A, such as by using screwed fasteners 38 shown in FIGS. 8 and 9. As seen in FIGS. 3–6, the drum 20 includes a peripheral hub 40 of generally cylindrical configuration having a pair of end segments 40A being turned inwardly toward the rotational axis A of the shaft 18 and drum 20 and disposed in a facing relationship to one another with the second end portion 36 of the coupling cable 22 secured or clamped between the end segments 40A. The drum 20 also includes a plurality of radial stiffening spokes 42 disposed between and interconnecting the hub 40 and the shaft 18 such that the drum 20 undergoes rotation with the shaft 18. The shaft 18 has a hollow interior and a slot 44 in a portion of the shaft 18 located within the drum 20 through which the second end portion 36 of the coupling cable 22 extends into the hollow interior of the shaft 18.

Figure 4:
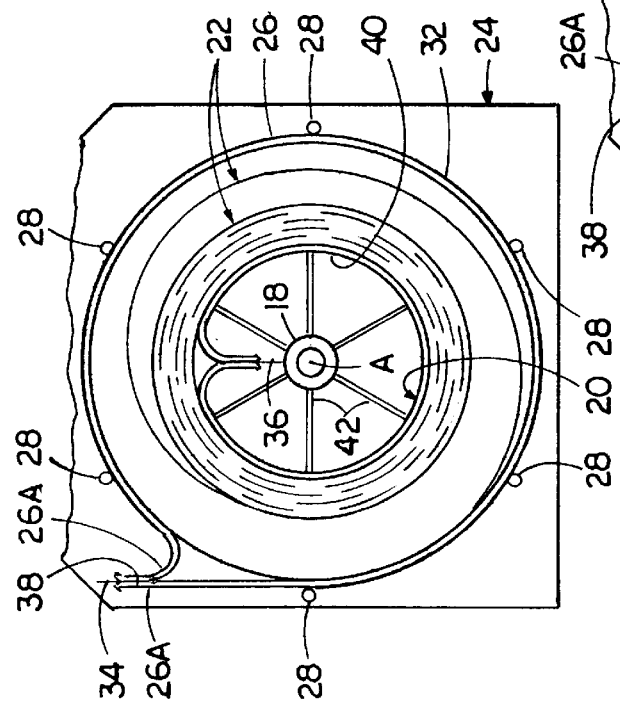
FIG. 4 is an elevational view of the apparatus showing the coupling cable substantially fully wound in a counterclockwise direction on a rotary drum of the apparatus.

By being disposed within the chamber 14 about the rotatable drum 20 and connected between the housing 12 and the drum 20 as described above, the coupling cable 22 is thereby adapted to wind about the rotatable drum 20 away from the circumferential side wall 26 of the housing 12 until reaching a wound condition, as seen in FIGS. 4 and 5, about the drum 20 and to unwind from the rotatable drum 20 toward the circumferential side wall 26 of the housing 12 until reaching an unwound condition, as represented in dashed outline in FIG. 3, as the shaft 18 and drum 20 undergo rotation in clockwise and counterclockwise directions relative to the stationary housing 12. More particularly, the coupling cable 22 preferably has a resiliently flexible flat construction which biases the coupling cable 22 toward the unwound condition such that the coupling cable 22 is adapted to unwind from and wind about the drum 20 as the rotatable shaft 18 and drum 20 undergo either one of clockwise and counterclockwise rotations relative to the housing 12 whereby the shaft 18 and drum 20 can continue rotation in a respective one of clockwise and counterclockwise directions as the coupling cable 22 unwinds from and then winds about the drum 20 before having to reverse direction when the coupling cable 22 reaches the wound condition about the drum 20. Such construction and winding and unwinding of the coupling cable 22 permits the shaft 18 to be rotated about twice the number of revolutions of the shaft 18 before further rotation is prohibited by the coupling cable 22 than if the coupling cable 22 would only wind about the shaft 18 when the shaft 18 was rotated in one of the opposite clockwise and counterclockwise directions.

Figure 6:
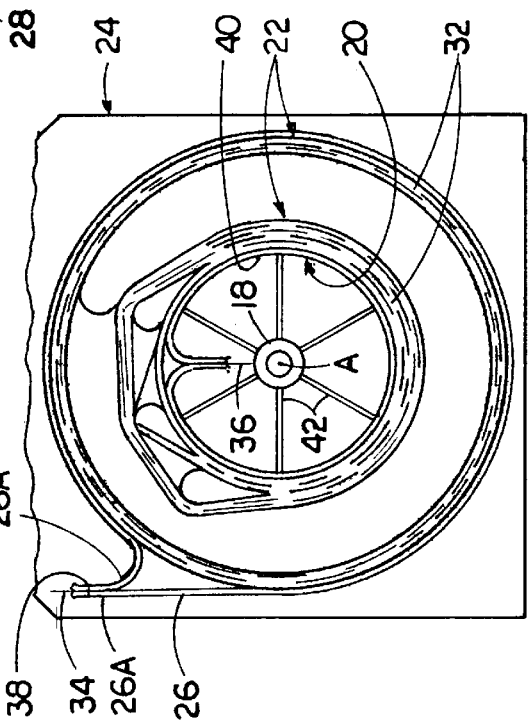
FIG. 6 is an elevational view similar to that of FIGS. 4 and 5 but showing the coupling cable partially wound in both clockwise and counterclockwise directions of the rotary drum of the apparatus.

FIG. 6 depicts the condition of the coupling cable 22 after the shaft 18 has been rotated in the opposite directions several times without the coupling cable 22 reaching either the wound condition or unwound condition relative to the drum 20. In FIG. 6, the coupling cable 22 is shown partially wound in both clockwise and counterclockwise directions about the drum 20 of the apparatus 10.

Referring to FIGS. 1 and 2, the coupling cable 22 may include a plurality of internal communications elements 46 being separable from one another at the first and second opposite end portions 34, 36 of the coupling cable 22 so as to adapt the segments 46 for connection to separate external communications elements. One 24A of the spaced end walls 24 of the stationary housing 12 has a plurality of first connection sites 48 spaced thereon and adapted to connect with respective ones of the internal communications segments 46 of the coupling cable 22 at the first opposite end portion 34 thereof. The apparatus 10 also may include an annular member 50 in the form of a frustoconical shaped transfer wheel mounted to an end portion of the shaft 18 located outside of the housing 12. The annular member 50 has a plurality of second connection sites 52 spaced thereon adapted to connect with respective separated ones of the internal communications segments 46 of the coupling cable 22 at the second opposite end portion 36 thereof. These segments 46 of the coupling cable 22 at its second opposite end portion 36 can, in turn, be incorporated into another cable (not shown) wound about a spool 54 supported on the shaft 18 next to the annular member 50. When used in conjunction with the rotary coupling apparatus 10 as described above, the spool 54 can achieve much greater travel distances with the apparatus 10 using an active length of coupling cable 22 which is only one-half that which might otherwise be required.

Figure 10:
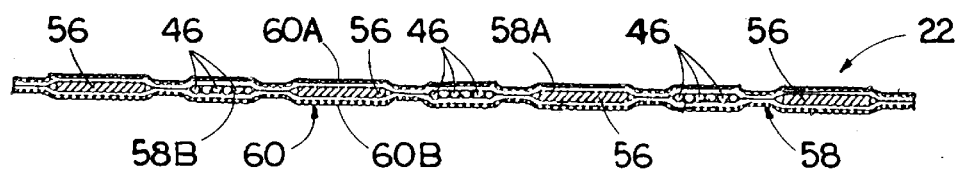
FIG. 10 is a cross-sectional view of the composite ribbon coupling cable.

Composite Ribbon Coupling Cable Referring to FIGS. 9 and 10, there is illustrated the coupling cable 22 in the form of a composite ribbon coupling cable comprising the invention of the patent application cross-referenced above. The composite ribbon coupling cable 22 basically includes a plurality of elongated internal strengthening elements 56 made of a resilient springy material, the forementioned plurality of elongated internal communications elements 46, an inner jacket 58 of insulative material encapsulating the strengthening elements 56 and communications elements 46 therewithin so as to dispose the encapsulated elements 56, 46 in a substantially common plane providing a substantially flat ribbon configuration, and an outer jacket 60 of resilient wear-resistant protective material encapsulating the inner jacket 58 of insulative material. At least some and preferably all of the elongated strengthening and communications elements 56, 46 are disposed in an alternating spaced apart relation with one another, as best seen in FIG. 10.

More particularly, the strengthening elements 56 preferably are substantially elongated bands of a spring metal while the communications elements 46 have substantially fiber optic cores or copper cores. The inner jacket 58 includes a pair of inner flat layers 58A, 58B of insulative material disposed along and adhered to opposite sides of the alternating strengthening elements 56 and communications elements 46. The outerjacket 60 includes a pair of outerflat layers 60A, 60B of wear-resistant protective material each disposed along and adhered to an outer surface of one of the inner flat layers 58A, 58B of the inner jacket 58 of insulative material.

A significant advantage of the above described construction is that as many elements 46 as reasonably required can be incorporated within the cable 22. The fiber optic and copper cores 46 can readily be separated and extended beyond the first and second connection sites 48, 52 of the cable 22 onto the housing 12 and the shaft 18 and routed to suitable terminations external thereto so as to provide an interconnect facility for associated equipment.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A rotary coupling apparatus, comprising:
   (a) a stationary housing having a pair of spaced end walls and a circumferential side wall disposed therebetween, said end walls defining a chamber therebetween, said circumferential side wall defining an outer periphery of said chamber;
   (b) an elongated rotatable member extending through said chamber between said end walls and mounted to undergo rotation relative to said end walls, said circumferential side wall being radially spaced outwardly from and extending about said rotatable member; and
   (c) an elongated coupling cable for carrying communications elements being disposed in said chamber between said circumferential side wall and said rotatable member, said coupling cable terminating in a pair of opposite end portions, a first of said opposite end portions being secured to said stationary housing and a second of said opposite end portions being secured to said rotatable member such that said second end portion of said coupling cable rotates with said rotatable member as said first end portion of said coupling cable remains stationary with said stationary housing, said coupling cable being adapted to wind about said rotatable member and away from said circumferential side wall of said housing until reaching a wound condition about said rotatable member and to unwind from said rotatable member and toward said circumferential side wall of said housing until reaching an unwound condition as said rotatable member undergoes rotation in clockwise and counterclockwise directions relative to said stationary housing, said coupling cable including a plurality of internal communications elements being separable from one another at said first and second opposite end portions of said coupling cable so as to adapt said segments for connection to separate external communications elements and one of said end walls of said stationary housing having a plurality of connection sites adapted to connect with respective ones of said internal communications segments of said coupling cable at said first opposite end portion thereof.

2. The apparatus as recited in claim 1, wherein said coupling cable is adapted to unwind from and wind about said rotatable member as said rotatable member undergoes either one of clockwise and counterclockwise rotations relative to said housing whereby said rotatable member can continue rotation in a given one of the clockwise and counterclockwise directions as said coupling cable unwinds from and then winds about said rotatable member before having to reverse direction when said coupling cable reaches said wound condition about said rotatable member.

3. The apparatus as recited in claim 1, wherein said rotatable member includes:
   an elongated shaft extending through said chamber between said end walls; and
   bearings disposed outside of said end walls of said housing mounting said elongated shaft to undergo rotation relative to said end walls.

4. The apparatus as recited in claim 3, wherein said rotatable member further includes a hollow drum disposed within said chamber and supported about said shaft to undergo rotation therewith.

5. The apparatus as recited in claim 1, said coupling cable has a resiliently flexible flat construction.

6. The apparatus as recited in claim 5, wherein said construction of said coupling cable biases said coupling cable to unwind from said rotatable member toward said circumferential side wall of said stationary housing.

7. The apparatus as recited in claim 6, wherein said construction of said coupling cable adapts said coupling cable to unwind from and wind about said rotatable member as said rotatable member undergoes either one of clockwise and counterclockwise rotations relative to said stationary housing whereby said rotatable member can continue rotation in a given one of the clockwise and counterclockwise directions as said coupling cable unwinds from and then winds about said rotatable member before having to reverse direction when said coupling cable reaches said wound condition about said rotatable member.

8. The apparatus as recited in claim 1, further comprising:
   an annular member mounted to said rotatable member outside of said housing and having a plurality of connection sites adapted to connect with respective separated ones of said internal communications segments of said coupling cable at said second opposite end portion thereof.

9. The apparatus as recited in claim 1, wherein said housing also includes a plurality of fasteners extending between and interconnecting said end walls and disposed exteriorly of and spaced about said circumferential side wall of said housing so as to retain said circumferential side wall in a stationary position between said end walls.

10. The apparatus as recited in claim 1, wherein said circumferential side wall of said stationary housing has a pair of end portions disposed in a facing relationship to one another with said first end portion of said coupling cable secured between said end portions.

11. A rotary coupling apparatus, comprising:
   (a) a stationary housing having a pair of spaced end walls and a circumferential side wall disposed therebetween, said end walls defining a chamber therebetween, said circumferential side wall defining an outer periphery of said chamber;
   (b) an elongated rotatable member extending through said chamber between said end walls and mounted to undergo rotation relative to said end walls, said circumferential side wall being radially spaced outwardly from and extending about said rotatable member, said rotatable member including a hollow drum disposed within said chamber and supported to undergo rotation relative to said stationary housing about a rotational axis of said drum; and
   (c) an elongated coupling cable for carrying communications elements being disposed in said chamber between said circumferential side wall and said rotatable member, said coupling cable terminating in a pair of opposite end portions, a first of said opposite end portions being secured to said stationary housing and a second of said opposite end portions being secured to said rotatable member such that said second end portion of said coupling cable rotates with said rotatable member as said first end portion of said coupling cable remains stationary with said stationary housing, said coupling cable being adapted to wind about said rotatable member and away from said circumferential side wall of said housing until reaching a wound condition about said rotatable member and to unwind from said rotatable member and toward said circumferential side wall of said housing until reaching an unwound condition as said rotatable member undergoes rotation in clockwise and counterclockwise directions relative to said stationary housing, said drum including a peripheral hub having a pair of end segments being turned inwardly toward said rotational axis of said drum and disposed in a facing relationship to one another with said second end portion of said coupling cable secured between said end segments.

12. The apparatus as recited in claim 11, wherein said rotatable member further includes an elongated shaft extending through said chamber between said end walls and mounted to undergo rotation relative to said end walls, said drum also including a plurality of radial stiffening spokes being disposed between and interconnecting said hub and said shaft such that said drum undergoes rotation with said shaft.

13. The apparatus as recited in claim 11, wherein said rotatable member further includes an elongated shaft extending through said chamber between said end walls and mounted to undergo rotation relative to said end walls, said drum being supported about said shaft to undergo rotation therewith.

14. The apparatus as recited in claim 13, wherein said shaft has a hollow interior and a slot in a portion of said shaft through which said second end portion of said coupling cable extends into said hollow interior of said shaft.

15. A rotary coupling apparatus, comprising:
   (a) a stationary housing having a pair of spaced end walls and a circumferential side wall disposed therebetween, said end walls defining a chamber therebetween, said circumferential side wall defining an outer periphery of said chamber and having a pair of end portions defining an outer opening therebetween, said housing also including a plurality of fasteners extending between and interconnecting said end walls and disposed exteriorly of and spaced about said circumferential side wall of said housing so as to retain said circumferential side wall in a stationary position between said end walls;
   (b) an elongated hollow shaft extending through said chamber between said end walls and mounted to undergo rotation relative to said end walls, said circumferential side wall being radially spaced outwardly from and extending about said hollow shaft;

(c) a hollow drum disposed within said chamber and supported about said shaft to undergo rotation therewith, said drum having a pair of end segments defining a peripheral opening therebetween; and (d) an elongated coupling cable disposed in said chamber between said circumferential side wall and said drum, said coupling cable terminating in a pair of opposite end portions, a first of said opposite end portions of said coupling cable being secured to and extending through said outer opening defined between said end portions of said circumferential side wall of said stationary housing and a second of said opposite end portions of said coupling cable being secured to and extending through said peripheral opening defined between said end segments of said drum so that said second end portion of said coupling cable rotates with said drum and shaft as said first end portion of said coupling cable remains stationary with said housing permitting winding of said coupling cable about said drum until reaching a substantially wound condition relative to said drum and unwinding of said coupling cable from said drum until reaching a substantially unwound condition relative to said drum, said coupling cable having a resiliently flexible flat construction biasing said coupling cable toward said unwound condition as said coupling cable respectively unwinds relative to said drum as said drum and shaft undergo either one of clockwise and counterclockwise rotations relative to said stationary housing whereby said coupling cable can unwind from and wind about said drum as said shaft and drum undergo either one of clockwise and counterclockwise rotations relative to said housing which permits said shaft and drum to continue rotation in a given one of the clockwise and counterclockwise directions as said coupling cable winds about and then unwinds from said drum before having to reverse direction when coupling cable reaches said wound condition about said drum.

16. The apparatus as recited in claim 15, further comprising:

bearings disposed outside of said end walls of said housing mounting said elongated shaft to undergo rotation relative to said end walls.

17. A rotary coupling apparatus, comprising:

(a) a stationary housing having a pair of spaced end walls and a circumferential side wall disposed therebetween, said end walls defining a chamber therebetween, said circumferential side wall defining an outer periphery of said chamber and having a pair of end portions defining an outer opening therebetween;

(b) an elongated hollow shaft extending through said chamber between said end walls and mounted to undergo rotation relative to said end walls, said circumferential side wall being radially spaced outwardly from and extending about said hollow shaft;

(c) a hollow drum disposed within said chamber and supported about said shaft to undergo rotation therewith, said drum having a pair of end segments defining a peripheral opening therebetween; and (d) an elongated coupling cable disposed in said chamber between said circumferential side wall and said drum, said coupling cable terminating in a pair of opposite end portions, a first of said opposite end portions of said coupling cable being secured to and extending through said outer opening defined between said end portions of said circumferential side wall of said stationary housing and a second of said opposite end portions of said coupling cable being secured to and extending through said peripheral opening defined between said end segments of said drum so that said second end portion of said coupling cable rotates with said drum and shaft as said first end portion of said coupling cable remains stationary with said housing permitting winding of said coupling cable about said drum until reaching a substantially wound condition relative to said drum and unwinding of said coupling cable from said drum until reaching a substantially unwound condition relative to said drum, said coupling cable having a resiliently flexible flat construction biasing said coupling cable toward said unwound condition as said coupling cable respectively unwinds relative to said drum as said drum and shaft undergo either one of clockwise and counterclockwise rotations relative to said stationary housing whereby said coupling cable can unwind from and wind about said drum as said shaft and drum undergo either one of clockwise and counterclockwise rotations relative to said housing which permits said shaft and drum to continue rotation in a given one of the clockwise and counterclockwise directions as said coupling cable winds about and then unwinds from said drum before having to reverse direction when coupling cable reaches said wound condition about said drum, said drum including a peripheral hub having said pair of end segments being turned inwardly toward said rotational axis of said drum and disposed in a facing relationship to one another with said second end portion of said coupling cable secured between said end segments.

18. The apparatus as recited in claim 17, wherein said drum also includes a plurality of radial stiffening spokes disposed between and interconnecting said hub and said shaft such that said drum undergoes rotation with said shaft.

19. A rotary coupling apparatus, comprising:

(a) a stationary housing having a pair of spaced end walls and a circumferential side wall disposed therebetween, said end walls defining a chamber therebetween, said circumferential side wall defining an outer periphery of said chamber and having a pair of end portions defining an outer opening therebetween;

(b) an elongated hollow shaft extending through said chamber between said end walls and mounted to undergo rotation relative to said end walls, said circumferential side wall being radially spaced outwardly from and extending about said hollow shaft;

(c) a hollow drum disposed within said chamber and supported about said shaft to undergo rotation therewith, said drum having a pair of end segments defining a peripheral opening therebetween; and (d) an elongated coupling cable disposed in said chamber between said circumferential side wall and said drum, said coupling cable terminating in a pair of opposite end portions, a first of said opposite end portions of said coupling cable being secured to and extending through said outer opening defined between said end portions of said circumferential side wall of said stationary housing and a second of said opposite end portions of said coupling cable being secured to and extending through said peripheral opening defined between said end segments of said drum so that said second end portion of said coupling cable rotates with said drum and shaft as said first end portion of said coupling cable remains stationary with said housing permitting winding of said coupling cable about said drum until reaching a substantially wound condition relative to said drum and unwinding of said coupling cable from said drum until reaching a substantially unwound condition relative to said drum, said coupling cable having a resiliently flexible flat construction biasing said coupling cable toward said unwound condition as said coupling cable respectively unwinds relative to said drum as said drum and shaft undergo either one of clockwise and counterclockwise rotations relative to said stationary housing whereby said coupling cable can unwind from and wind about said drum as said shaft and drum undergo either one of clockwise and counterclockwise rotations relative to said housing which permits said shaft and drum to continue rotation in a given one of the clockwise and counterclockwise directions as said coupling cable winds about and then unwinds from said drum before having to reverse direction when coupling cable reaches said wound condition about said drum, said shaft having a hollow interior and a slot in a portion of said shaft through which said second end portion of said coupling cable extends into said hollow interior of said shaft.

20. A rotary coupling apparatus, comprising:

(a) a stationary housing having a pair of spaced end walls and a circumferential side wall disposed therebetween, said end walls defining a chamber therebetween, said circumferential side wall defining an outer periphery of said chamber and having a pair of end portions defining an outer opening therebetween:

(b) an elongated hollow shaft extending through said chamber between said end walls and mounted to undergo rotation relative to said end walls, said circumferential side wall being radially spaced outwardly from and extending about said hollow shaft:

(c) a hollow drum disposed within said chamber and supported about said shaft to undergo rotation therewith, said drum having a pair of end segments defining a peripheral opening therebetween; and (d) an elongated coupling cable disposed in said chamber between said circumferential side wall and said drum, said coupling cable terminating in a pair of opposite end portions, a first of said opposite end portions of said coupling cable being secured to and extending through said outer opening defined between said end portions of said circumferential side wall of said stationary housing and a second of said opposite end portions of said coupling cable being secured to and extending through said peripheral opening defined between said end segments of said drum so that said second end portion of said coupling cable rotates with said drum and shaft as said first end portion of said coupling cable remains stationary with said housing permitting winding of said coupling cable about said drum until reaching a substantially wound condition relative to said drum and unwinding of said coupling cable from said drum until reaching a substantially unwound condition relative to said drum, said coupling cable having a resiliently flexible flat construction biasing said coupling cable toward said unwound condition as said coupling cable respectively unwinds relative to said drum as said drum and shaft undergo either one of clockwise and counterclockwise rotations relative to said stationary housing whereby said coupling cable can unwind from and wind about said drum as said shaft and drum undergo either one of clockwise and counterclockwise rotations relative to said housing which permits said shaft and drum to continue rotation in a given one of the clockwise and counterclockwise directions as said coupling cable winds about and then unwinds from said drum before having to reverse direction when coupling cable reaches said wound condition about said drum, said end portions of said circumferential side wall of said stationary housing being in a facing relationship to one another with said first end portion of said coupling cable secured between said end portions.

\* \* \* \* \*